United States Patent
Petry et al.

(10) Patent No.: US 12,181,093 B2
(45) Date of Patent: Dec. 31, 2024

(54) WELDABLE HALF-SHELL

(71) Applicant: Georg Fischer Rohrleitungssysteme AG, Schaffhausen (CH)

(72) Inventors: Dirk Petry, Feuerthalen (CH); Markus Breyer, Radolfzell (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 18/332,818

(22) Filed: Jun. 12, 2023

(65) Prior Publication Data

US 2023/0417355 A1   Dec. 28, 2023

(30) Foreign Application Priority Data

Jun. 24, 2022  (EP) .................................... 22180897

(51) Int. Cl.
  *F16L 47/03*  (2006.01)
  *F16L 43/00*  (2006.01)
  *F16L 43/02*  (2006.01)

(52) U.S. Cl.
  CPC ............. *F16L 47/03* (2013.01); *F16L 43/008* (2013.01); *F16L 43/02* (2013.01)

(58) Field of Classification Search
  CPC ......... F16L 47/03; F16L 43/008; F16L 43/02; F16L 21/06; F16L 21/065
  See application file for complete search history.

(56) References Cited

U.S. PATENT DOCUMENTS

| 5,022,685 | A |   | 6/1991 | Stiskin et al. | |
| 5,252,810 | A | * | 10/1993 | Trosch | F16L 47/03 |
| 5,321,233 | A | * | 6/1994 | Barrett | F16L 47/03 |
| 5,364,130 | A | * | 11/1994 | Thalmann | F16L 47/03 |
| 6,198,081 | B1 | * | 3/2001 | Steinmetz | |
| 6,331,698 | B1 | * | 12/2001 | Hintzen | F16L 47/03 |
| 6,364,367 | B1 |   | 4/2002 | Hintzen | |
| 2019/0137024 | A1 | * | 5/2019 | Cooper | F16L 47/03 |
| 2019/0360625 | A1 | * | 11/2019 | Genoni | F16L 47/03 |

FOREIGN PATENT DOCUMENTS

| DE | 19519341 C1 | 6/1996 | |
| FR | 2171223 A1 | 9/1973 | |
| FR | 2516439 A * | 5/1983 | ............. F16L 47/03 |
| JP | H11-173483 A | 6/1999 | |

OTHER PUBLICATIONS

FR-2516439-A—Machine Translation—English (Year: 1983).*
DE-19519341-C1—Machine Translation—English (Year: 1996).*

* cited by examiner

*Primary Examiner* — William S. Choi
(74) *Attorney, Agent, or Firm* — Harness, Dickey & Pierce, P.L.C.

(57) ABSTRACT

A fitting for connecting a secondary plastic pipeline of a double pipe system containing two half-shells composed of plastic, wherein in each case each of the half-shells has an integrated heating wire, wherein the heating wire is arranged in each case in the regions of the connecting pieces and the heating wire has several meandering windings, wherein the heating wire is arranged in each case in a groove provided for this in the half-shell and the connecting elements which connect the two half-shells, characterized in that the fitting has distance elements arranged on the inner circumference of the half-shells for concentric arrangement of the fitting with respect to a primary pipeline.

8 Claims, 3 Drawing Sheets

WELDABLE HALF-SHELL

CROSS REFERENCE TO RELATED APPLICATION

The present application claims priority to European Patent Application No. 22 180 897.5, filed on Jun. 24, 2022, the entire contents of which are incorporated herein by reference.

TECHNICAL FIELD

The invention relates to a fitting for connecting a secondary plastic pipeline of a double pipe system containing two half-shells composed of plastic, wherein in each case each of the half-shells has an integrated heating wire, wherein the heating wire is arranged in each case in the regions of the connecting pieces and the heating wire has several meandering windings and is arranged in each case in a groove provided for this in the half-shell and the connecting elements which connect the two half-shells.

BACKGROUND

Double pipe systems are either legally required or are installed by end users in order to prevent the unexpected discharge of hazardous chemicals into the environment or prevent harm to people. Moreover, double pipe systems are used for the protection in particular of costly plant (machines, IT infrastructure). The secondary pipeline is composed of a protective pipe which enclose the inner or primary fluid-conducting pipe. Secondary retention systems can be designed to be either buried or above ground, under pressure or as a drainage system and generally have a type of detection system to identify leaks. Current systems are connected to one another by means of simultaneous or cascade welding. The connection technology varies significantly from continent to continent. In particular in Europe, however, the connections are increasingly being established by heat welding (in the case of polyolefins).

It is known from the prior art that fittings which have already been prefabricated are produced with an inner and outer fitting, and these are then connected in each case to an inner and outer pipe. As a result of the many different diameters of the inner and outer pipes and the various fittings such as T-piece, elbows, etc. which have to be prefabricated, a high level of stock is necessary, which is nowadays no longer desired. In a similar manner, secondary containment pipes are produced in that a smaller inner/main pipe is inserted into a larger outer/containment pipe and provided with a centring piece. The connection of the pipes to the shaped pieces is then the most difficult task. Existing systems require a significant number of simultaneous connections for installation. Typical adhesive connections are performed in that firstly a primer is applied onto two surfaces which fit together; the cementite is then applied onto both surfaces, followed by the quick joining together of the corresponding parts with a quarter turn and then fixing the parts, for thirty seconds to a minute, until the cementite sets.

This method is understandably more difficult to achieve if an attempt is made to simultaneously produce an inner and an outer connection. There are twice as many surfaces which have to be prepared and the inner pipe has to be fastened to the protective pipe in order to ensure full insertion of the sleeve. Moreover, the inner connection is performed "blind" in the case of a simultaneous connection. Further disadvantages of the existing systems also include the inability to inspect the inner connection during pressure testing and the difficulty in locating and repairing a defective connection if a leak occurs.

SUMMARY

An aspect of the invention is to propose a fitting for a secondary pipeline of a double pipe system which can be produced in a simple and low-cost manner and it is possible to check the connecting points of the primary and secondary pipeline during assembly.

This aspect is achieved according to the invention in that the fitting has distance elements arranged on the inner circumference of the half-shells for concentric arrangement of the fitting with respect to a primary pipeline.

The fitting according to the invention for connecting a secondary plastic pipeline of a double pipe system containing two half-shells composed of plastic. The half-shells have in each case an integrated heating wire, wherein the heating wire is arranged in each case in the regions of the connecting pieces. The heating wire has, in the region of the connecting pieces, several meandering windings, i.e. the heating wire runs along or in grooves on the inner diameter of the half-shells, wherein the heating wire extends preferably in lines which run parallel to one another and are connected to one another via radii. The heating wire is arranged in a groove provided for this in the half-shell, wherein the heating wire is preferably incorporated into the half-shell by ploughing in. The fitting furthermore has connecting elements which connect the two half-shells. In order to achieve good welding, the two half shells are clamped together by the connecting elements which are arranged along the separating plane on the outside diameter, preferably at regular intervals. The fitting has distance elements arranged on the inner circumference of the half-shells for concentric arrangement of the fitting with respect to a primary pipeline. The configuration according to the invention of the fitting of the secondary pipeline makes it possible to place the two half-shells around the already assembled primary pipeline. The welds or connections of the primary pipeline can thus be checked in advance and subsequently the secondary pipeline can be installed around it.

It has been shown to be advantageous if the distance elements are formed as circular segment-like discs which bear against the outer diameter of a primary pipeline. The distance elements are arranged concentrically in the half-shell and are preferably formed in one part with the half-shell or injection moulded thereon. It is advantageous if the distance elements are arranged in the central region of the half-shell between the regions of the connecting pieces.

The heating wire preferably runs along the edge of the half-shells. The half-shell is formed by a separating plane which runs along and through the central axis or longitudinal axis of the fitting, as a result of which the open edges of the half-shell are formed.

The heating wire windings arranged in the region of the connecting pieces are preferably connected to one another via the heating wire running along the edge. As a result of this, uniform heating is achieved.

It is advantageous if the half-shells have a welding display, as a result of which it is identified whether welding has already been carried out or not. The welding display is preferably arranged along an edge of the half-shell. As a result of the preferably point-symmetrical formation of two half-shells which are joined together to form a fitting, the fitting has two welding displays which are arranged in each case at the start and at the end of the central region. The connecting pieces adjoin in each case the central region.

It has been shown to be a preferred embodiment if the connecting elements are formed as separate snap connections or snap connections arranged integrally thereon. It is advantageous if the connecting elements are arranged along the separating point of the two half-shells assembled to form a fitting. For this purpose, the half-shells preferably have opposite through-openings in which the connecting elements or snap connections are arranged or they are injection-moulded directly on the half-shells.

It has been shown to be advantageous if the snap connection is formed from a fixing piece which can be inserted into the half-shell or formed or injection-moulded thereon and a clip which can be inserted into the half-shell or formed or injection-moulded thereon. The fixing pieces are preferably arranged on one side of the half-shells and the clips on the other side of the half-shells and in the opposite half-shell correspondingly the other way round such that the half-shells can be connected to one another.

It has been shown to be advantageous if the fitting is formed as a T-piece, elbow or curved section.

The half-shells are preferably formed symmetrically or point-symmetrically. This optimizes the cost-effective production of such fittings.

BRIEF DESCRIPTION OF THE DRAWINGS

An exemplary embodiment of the invention is described on the basis of the figures, wherein the invention is not only restricted to the exemplary embodiment. In the figures.

DESCRIPTION OF THE PREFERRED EMBODIMENTS

Figure 1:
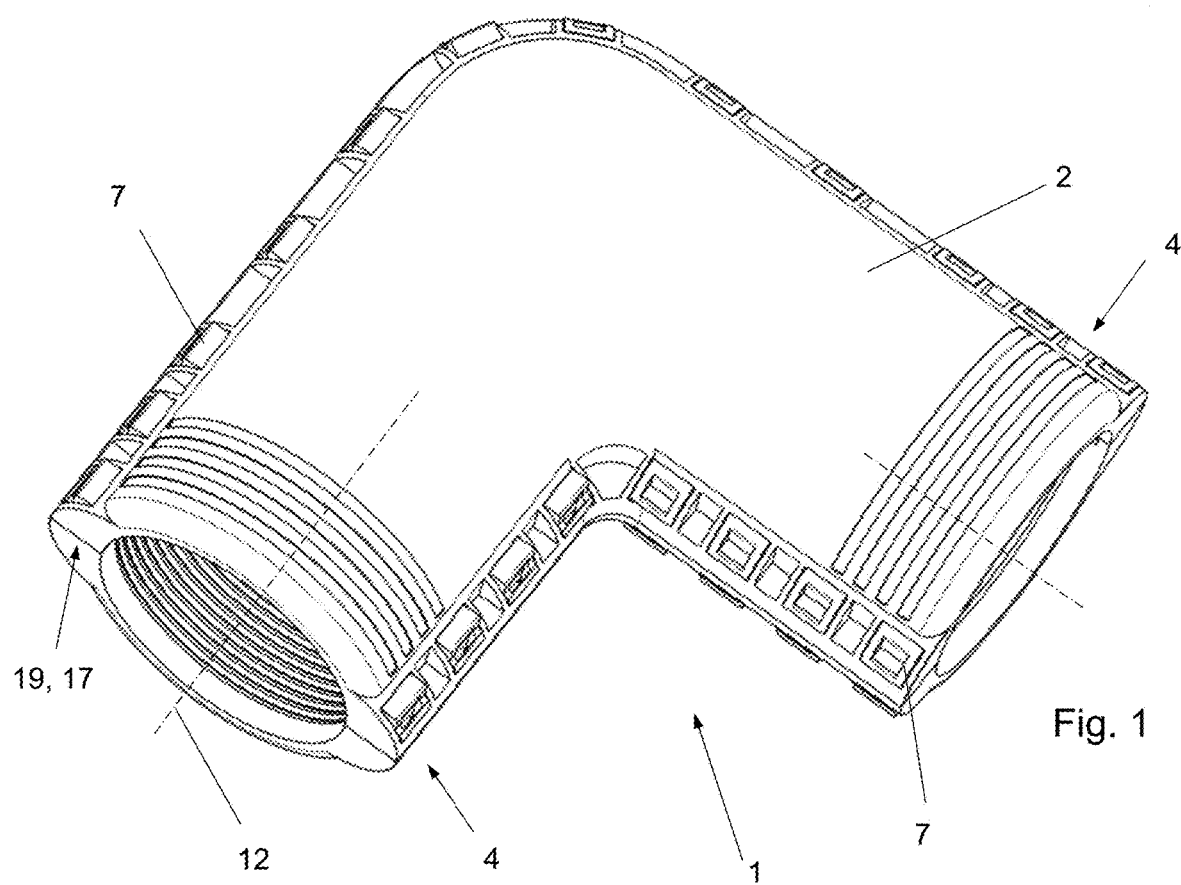
FIG. 1 shows a three-dimensional view of a fitting according to the invention of a secondary plastic pipeline.
Figure 2:
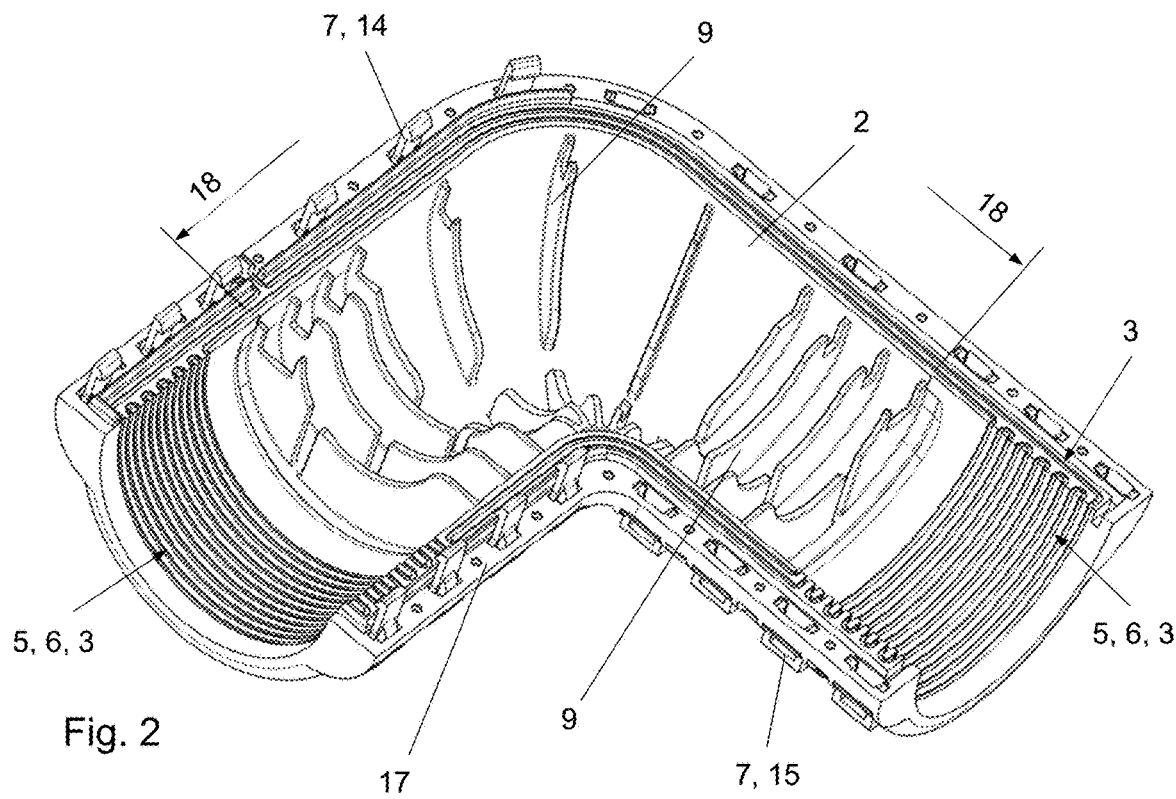
FIG. 2 shows a three-dimensional view of a half-shell of a fitting according to the invention with inserted connecting elements.

The drawing represented in FIG. 1 shows a three-dimensional view of a fitting 1 according to the invention. The fitting 1 serves to connect a secondary pipeline 11 of a double pipe system and surrounds the fittings 20 of the primary pipeline 10, such as also pipes or portions of the pipes of the primary pipeline, which is apparent from FIG. 5, wherein one half-shell 2 of the fitting 1 was hidden for an improved view. In the figures, exclusively elbows are formed as fitting 1, of course, this fitting 1 according to the invention also encompasses T-pieces and curved sections which connect the secondary pipeline 11. The fitting 1 contains two preferably symmetrical or point-symmetrical half-shells 2 composed of plastic. The two half-shells 2 bear against one another in the separating plane 19 which runs along the central axis or longitudinal axis 12 so that their edges 17 contact and form a closed fitting 1. The half-shells 2 have an integrated heating wire 3, wherein the heating wire 3 is arranged in each case in the regions of the connecting pieces 4 and runs as a meandering winding 5. The windings 5 extend on the inner diameter 8 of the half-shell 2 in the regions of the connecting pieces 4. In this region, the fitting 1 is welded to the pipe of the secondary pipeline 11. The heating wire 3 runs in the grooves 6 provided for this purpose, wherein the heating wire 3 is preferably ploughed in. The two half-shells 2 are connected to one another via connecting elements 7, wherein the connecting elements 7 are formed here as separate parts, which are apparent in FIG. 4A and FIG. 4B. Wherein a moulded-on embodiment of the snap connections is also conceivable. It is advantageous if the connecting elements 7 are formed as snap connections which are inserted in the through-openings 13 which are arranged at the margin of the edges 17 of the half-shells 2. The clips 14 are preferably, as shown in FIG. 2, arranged on one side of the half-shell 2 and, on the other side of the half-shell 2, the fixing pieces 15 and in the opposite half-shell 2 correspondingly symmetrically opposite, so that the clips 14 and fixing pieces 15 latch in one another. As is clearly apparent in FIGS. 2 and 3, the half-shells 2 have on their inner diameter 8 in the central region 18 distance elements 9 which bear against the fitting of the primary pipeline 10. It is thus enabled that the half-shells 2 in the region of the connecting pieces 4 have an inner diameter which matches the secondary pipe and in the central region 18 the fitting of the primary pipeline 10 is arranged in a positive locking manner and centrally in the fitting 1. The inner diameter 8 in the region of the connecting pieces 4 is welded directly to the pipe of the secondary pipeline and the fitting of the primary pipeline 10 is encompassed in a positive locking manner by the two half-shells 2 of the fitting 1 according to the invention. The distance elements 9 are preferably formed as circular segment-like discs which are arranged in one part on the inner diameter of the half-shell 2. The half-shells 2 in the mounted state then bear against the fittings of the primary pipeline and are welded at the connecting pieces to the pipes of the secondary pipeline 11.

Figure 3:
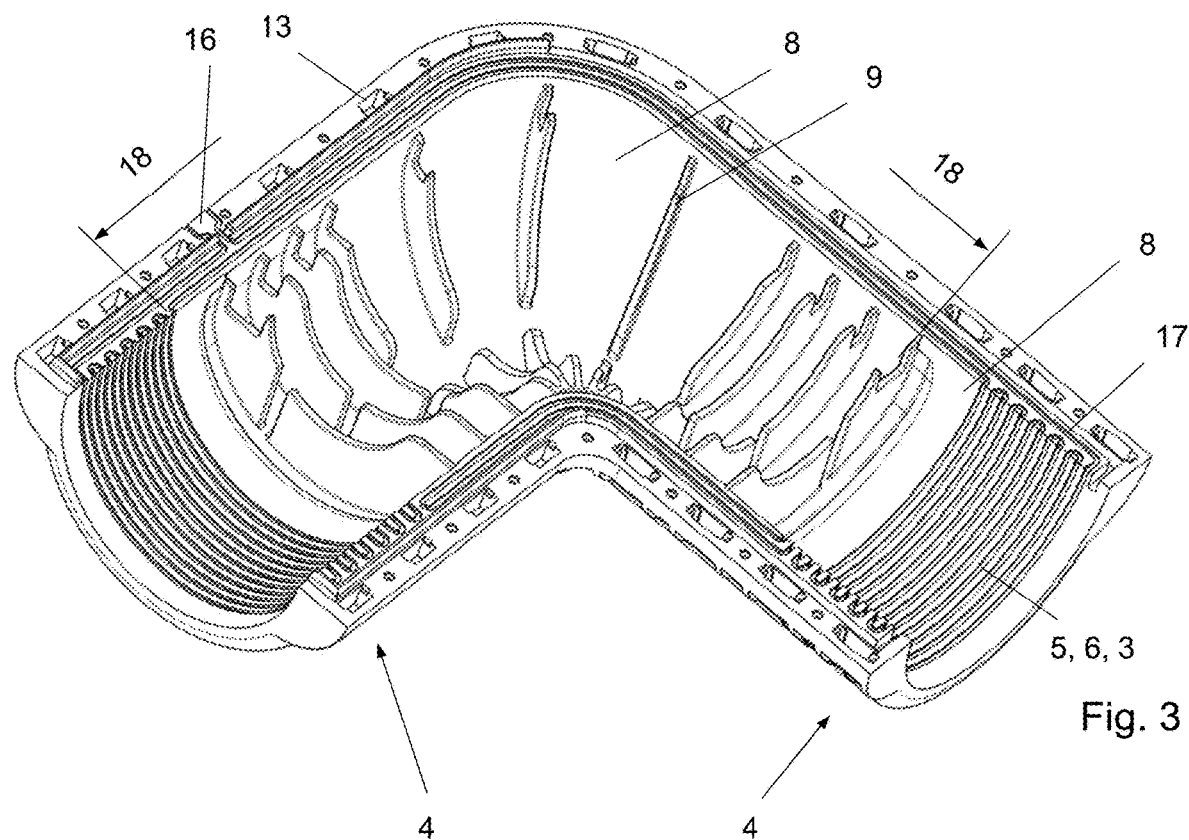
FIG. 3 shows a three-dimensional view of a half-shell of a fitting according to the invention.
Figure 4:
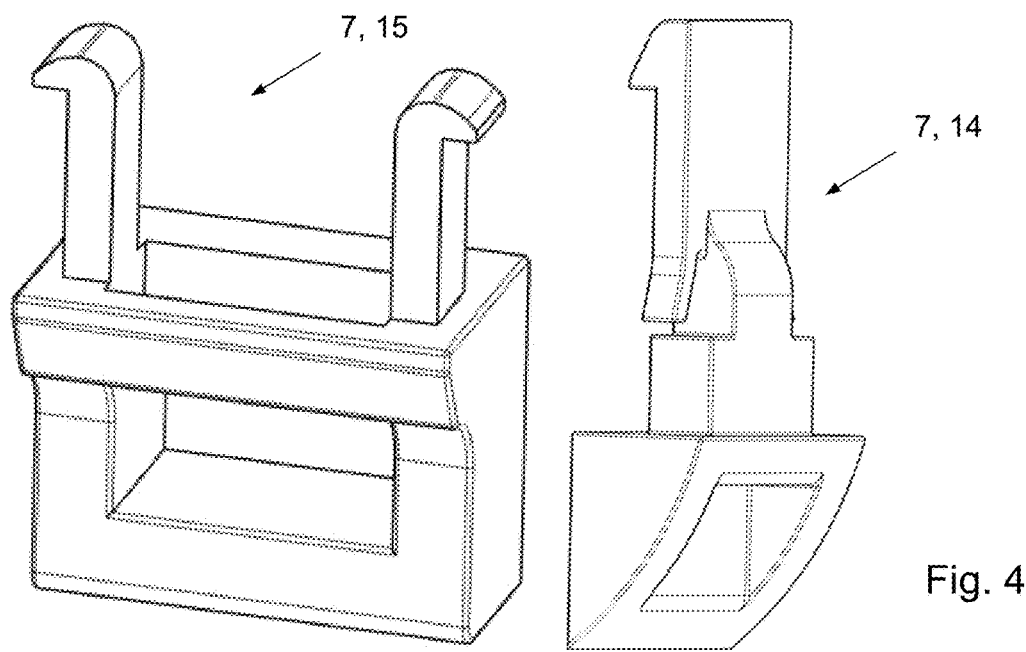
FIG. 4A and FIG. 4B show three-dimensional views of the connecting elements.
Figure 5:
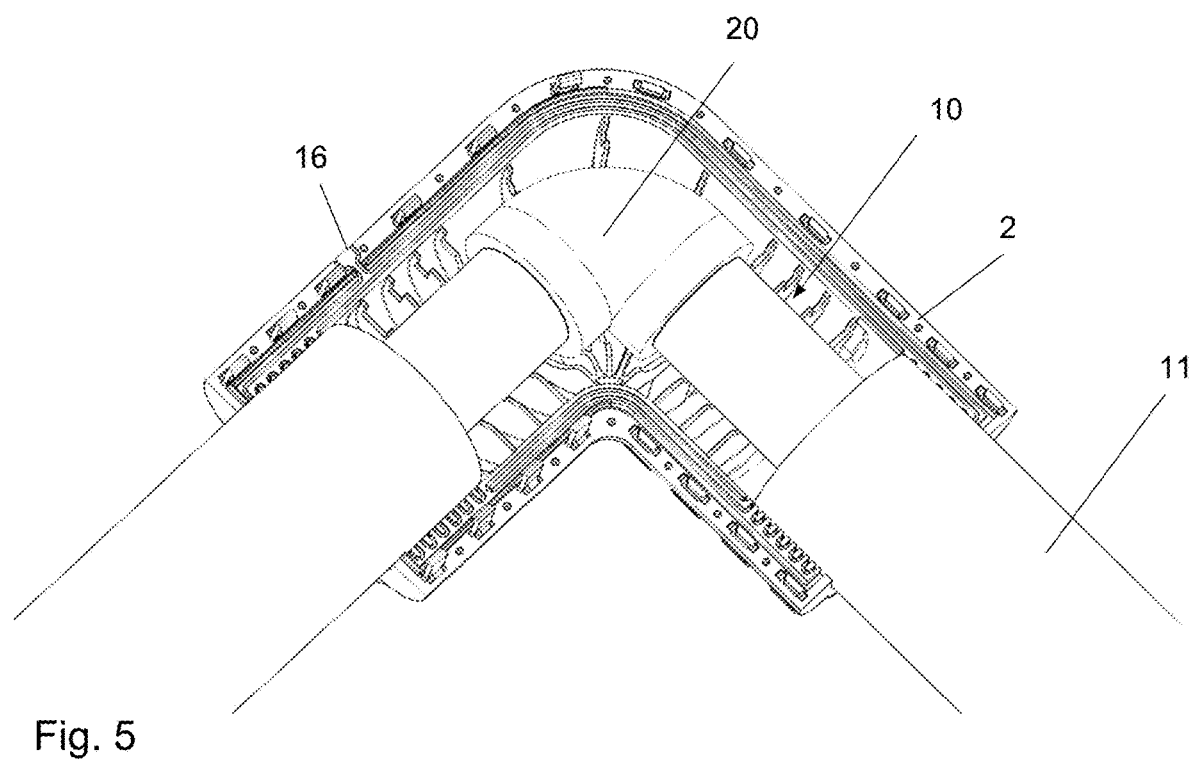
FIG. 5 shows a three-dimensional view of a half-shell with an installed primary pipeline.

It is furthermore clearly apparent in FIGS. 2 and 3 that the heating wire 3 extends along the edge 17 and connects the windings 5 to one another at the connecting pieces 4. It is furthermore advantageous if a welding display 16 is arranged on the half-shells 2 in order to identify whether the welding has already been carried out or not. FIG. 5 shows a cut-out from a double pipe system in the case of which a half-shell 2 was hidden in order to represent how the primary pipeline 10 or fitting is arranged therein. It is clearly apparent that the half-shell 2 according to the invention is not only welded to the other half-shell (hidden here), but rather also to the pipe of the primary pipeline and the fitting of the secondary pipeline 11 is arranged in a positive locking and centred manner in the fitting 1 according to the invention.

The invention claimed is:

1. A fitting for connecting a secondary plastic pipeline of a double pipe system containing two half-shells composed of plastic, the fitting comprising wherein each of the half-shells has an integrated heating wire, wherein each heating wire is arranged in regions of connecting pieces and the heating wire has several windings, wherein each heating wire is arranged in a respective groove provided in the half-shells and wherein connecting elements which connect the two half-shells, wherein the fitting has distance elements arranged on an inner circumference of the half-shells for concentric arrangement of the fitting with respect to a primary pipeline; and wherein the distance elements are formed as circular segmented discs which bear against an outer diameter of the primary pipeline.

2. The fitting according to claim 1, wherein the heating wire runs along the edge of the half-shells.

3. The fitting according to claim 1, wherein the heating wire windings arranged in the region of the connecting pieces are connected to one another via the heating wire running along an edge.

4. The fitting according to claim 1, wherein the half-shells have a welding display.

5. The fitting according to claim 1, wherein the connecting elements are formed as separate snap connections or snap connections arranged integrally on the fitting.

6. The fitting according to claim 5, wherein snap connections are formed from a fixing piece which can be inserted into the half-shell or arranged integrally thereon and a clip which can be inserted into the half-shell or arranged integrally thereon.

7. The fitting according to claim 1, wherein the fitting is formed as a T-piece, elbow or curved section.

8. The fitting according to claim 1, wherein the half-shells are formed symmetrically or point-symmetrically.

* * * * *